(12) United States Patent
Thackeray et al.

(10) Patent No.: US 10,573,889 B2
(45) Date of Patent: Feb. 25, 2020

(54) LAYERED-SPINEL ELECTRODES FOR LITHIUM BATTERIES

(71) Applicant: UCHICAGO ARGONNE, LLC, Chicago, IL (US)

(72) Inventors: Michael M. Thackeray, Naperville, IL (US); Jason R. Croy, Plainfield, IL (US); Brandon R. Long, Plainfield, IL (US); Eungje Lee, Naperville, IL (US); Joong Sun Park, Woodridge, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 89 days.

(21) Appl. No.: 14/982,226

(22) Filed: Dec. 29, 2015

(65) Prior Publication Data

US 2016/0190577 A1    Jun. 30, 2016

Related U.S. Application Data

(60) Provisional application No. 62/097,289, filed on Dec. 29, 2014.

(51) Int. Cl.
 H01M 4/485 (2010.01)
 H01M 4/131 (2010.01)
 (Continued)

(52) U.S. Cl.
 CPC ......... H01M 4/485 (2013.01); C01G 23/005 (2013.01); C01G 45/1228 (2013.01);
 (Continued)

(58) Field of Classification Search
 CPC ...... H01M 4/485; H01M 4/131; H01M 4/505; H01M 4/525; H01M 4/623; H01M 4/1315;
 (Continued)

(56) References Cited

U.S. PATENT DOCUMENTS 6,881,520 B1    4/2005   Li
7,303,840 B2    12/2007  Thackeray et al.
 (Continued)

FOREIGN PATENT DOCUMENTS

JP       2007213866 A  *  8/2007

OTHER PUBLICATIONS

Shatilo, Ya V., et al. "LiCoO 2—and LiMn 2 O 4-based composite cathode materials." Inorganic materials 42.7 (2006): 782-787.*
Kim, Seong-Bae, et al. "Nanostructure cathode materials prepared by high-energy ball milling method." Materials Letters 65.21 (2011): 3313-3316.*
 (Continued)

*Primary Examiner* — Stewart A Fraser
(74) *Attorney, Agent, or Firm* — Olson & Cepuritis, Ltd.; Robert J. Ross (57) ABSTRACT

An electrode for a lithium-ion cell comprising a 'layered-spinel' composite oxide material is disclosed. The 'layered-spinel' can be a material of formula $xLiMO_2 \cdot (1-x)Li_yM'_zO_4$, wherein $0<x<1$; $LiMO_2$ is a lithium metal oxide having a layered structure in which M comprises one or more transition metals and optionally lithium, and has a combined average oxidation state of +3; and $Li_yM'_zO_4$ is a lithium metal oxide having a spinel structure, $1 \leq y \leq 1.33$, $1.66 \leq z \leq 2$, and M' comprises one or more transition metals, and has a combined average metal oxidation state in the range of about +3.5 to about +4.

25 Claims, 5 Drawing Sheets

(51) Int. Cl.

| | |
|---|---|
| *H01M 4/505* | (2010.01) |
| *H01M 4/525* | (2010.01) |
| *H01M 4/62* | (2006.01) |
| *C01G 45/12* | (2006.01) |
| *C01G 51/00* | (2006.01) |
| *C01G 23/00* | (2006.01) |
| *C01G 53/00* | (2006.01) |
| *H01M 4/1315* | (2010.01) |
| *H01M 10/052* | (2010.01) |

(52) U.S. Cl.
CPC ......... *C01G 45/1242* (2013.01); *C01G 51/42* (2013.01); *C01G 53/42* (2013.01); *C01G 53/50* (2013.01); *H01M 4/131* (2013.01); *H01M 4/505* (2013.01); *H01M 4/525* (2013.01); *H01M 4/623* (2013.01); *C01P 2002/32* (2013.01); *C01P 2006/40* (2013.01); *H01M 4/1315* (2013.01); *H01M 10/052* (2013.01); *H01M 2300/0037* (2013.01)

(58) Field of Classification Search
CPC ........ H01M 10/052; H01M 2300/0037; C01G 23/005; C01G 45/1228; C01G 45/1242; C01G 51/42; C01G 53/42; C01G 53/50; C01P 2006/40
See application file for complete search history.

(56) References Cited

U.S. PATENT DOCUMENTS

| | | | |
|---|---|---|---|
| 7,635,536 B2 | 12/2009 | Johnson et al. | |
| 7,790,308 B2 | 9/2010 | Johnson et al. | |
| 8,080,340 B2 | 12/2011 | Thackeray et al. | |
| 2010/0086854 A1* | 4/2010 | Kumar ................ | H01M 4/505 429/223 |
| 2011/0111294 A1* | 5/2011 | Lopez ................ | H01M 4/134 429/217 |
| 2012/0263998 A1 | 10/2012 | Thackeray et al. | |
| 2013/0078518 A1 | 3/2013 | Thackeray et al. | |
| 2013/0157147 A1* | 6/2013 | Li ....................... | H01M 4/525 429/332 |
| 2013/0189575 A1* | 7/2013 | Anguchamy ......... | H01M 4/134 429/211 |

OTHER PUBLICATIONS

Lu, W., et al. "Isothermal calorimetry investigation of Li 1+ x Mn 2—y Al z O 4 spinel." Electrochimica Acta 52.19 (2007): 5837-5842.*

Nam, Kyung-Wan, et al. "In situ X-ray diffraction studies of mixed LiMn 2 O 4—LiNi ⅓ Co ⅓ Mn ⅓ O 2 composite cathode in Li-ion cells during charge—discharge cycling." Journal of Power Sources 192.2 (2009): 652-659. (Year: 2009).*

English machine translation of Tome et al. (JP 2007213866 A) (Year: 2007).*

Croy, J.R. et al., Li2MnO3-Based Composite Cathodes for Lithium Batteries: A Novel Synthesis Approach and New Structures, Electrochemistry Communications 13, 1063-1066 (2011).

Croy, J.R. et al., Designing High-Capacity, Lithium-Ion Cathodes Using X-ray Absorption Spectroscopy, Chemistry of Materials 23, 5415-5424 (2011).

Johnson, C.S. et al., Lithum-Manganese Oxide Electrodes With Layered-Spinel Composite Structures xLi2MnO3 (1-x)Li1+yMn2-yO4(0<x<1, 0≤y≤0.33) for Lithium Batteries, Electrochemistry Communications 7, 528-536 (2005).

Kan, Y. et al., Differentiating Allotropic LiCoO2/Li2Co2O4: A Structural and Electrochemical Study, Journal of Power Sources 271, 97-103 (2014).

Kim, D. et al., Composite 'Layered-Layered-Spinel' Cathode Structures for Lithium-Ion Batteries, Journal of the Electrochemical Society 160 (1), A31-A38 (2013).

Lee, E-S. et al., High-Voltage, High-Energy Layered-Spinel Composite Cathodes With Superior Cycle Life for Lithium-Ion Batteries, Chemistry of Materials 24, 600-612 (2012).

Long, B.R. et al., Advances in Stabilizing 'Layered-Layered' xLi2MnO3(1-x)LiMO2 (M=Mn, Ni, Co) Electrodes With a Spinel Component, Journal of the Electrochemical Society, 161 (14) A2160-A2167 (2014).

Park, S.-H. et al., Lithuim-Manganese-Nickel-Oxide Electrodes With Integrated Layered-Spinel Structures for Lithium Batteries, Electrochemistry Communications 9, 262-268 (2007).

Pereira, N. et al., Thermodynamically Induced Surface Modification for the Stabilization of High-Capacity LiCoO2, Journal of the Electrochemical Society, 155 (11), A831-A838 (2008).

Thackeray, M.M. et al., Advances in Manganese-Oxide 'Composite' Electrodes for Lithium-Ion Batteries, Journal of Materials Chemistry 15, 2257-2267 (2005).

* cited by examiner

LAYERED-SPINEL ELECTRODES FOR LITHIUM BATTERIES

CROSS-REFERENCE TO RELATED APPLICATIONS

This application claims priority benefit of U.S. Provisional Application Ser. No. 62/097,289, filed on Dec. 29, 2014, which is incorporated herein by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrode materials for electrochemical cells and batteries, particularly lithium and-lithium ion batteries, which terms are used interchangeably herein.

BACKGROUND

State-of-the-art lithium-ion batteries do not provide sufficient energy to power electric vehicles for an acceptable driving range. In addition, the demand for enhanced electrochemical capacity and energy in lithium-ion batteries that power portable electronic devices also is increasing. The limitations of current-day lithium batteries arise because the electrodes, both the anode, typically graphite, and the cathode, typically, layered $LiMO_2$ (M=Mn, Co, Ni) and compositional variations thereof, spinel $LiMn_2O_4$, and olivine $LiFePO_4$, do not offer sufficient capacity or a high enough electrochemical potential to meet the energy demands. Approaches that are currently being adopted to enhance the energy of lithium-ion batteries include the exploitation of structurally-integrated (composite) cathode structures that offer a significantly higher capacity compared to conventional cathode materials. In particular, lithium-rich and manganese-rich high capacity cathodes, such as $xLi_2MnO_3 \cdot (1-x)LiMO_2$ (M=Mn, Ni, Co) materials (often referred to as having 'layered-layered' composite structures, because both the $Li_2MnO_3$ and $LiMO_2$ components have layered-type structures) suffer from 'voltage fade' on repeated cycling, which reduces the energy output and efficiency of the cell, thereby compromising the management of cell/battery operation. There is, therefore, an ongoing need for new electrode materials to mitigate the structural and electrochemical instabilities of high capacity electrode materials. The electrodes, electrochemical cells, and batteries described herein address this need.

SUMMARY OF THE INVENTION

This invention is related primarily to stabilized electrodes for non-aqueous lithium batteries, and more specifically lithium-metal-oxide cathodes comprising 'layered-spinel' materials for these batteries. The term 'layered-spinel' includes structurally-integrated (composite) electrode structures comprising one or more layered components and compositions, one or more spinel components and compositions and/or one or more lithiated spinel components and compositions.

The best known electrode materials in commercial products include those with a layered rocksalt structure and stoichiometry such as lithium-cobalt-oxide, e.g., $LiCoO_2$ ('LCO'), which is used predominantly in lithium-ion batteries for portable consumer electronic applications such as cell phones and laptop computers; lithium-nickel-cobalt-aluminum-oxide, for example, $LiNi_{0.8}Co_{0.15}Al_{0.05}O_2$ ('NCA'); and lithium-nickel-cobalt-manganese-oxide, for example, $LiNi_{0.333}Co_{0.333}Mn_{0.333}O_2$ ('NCM'); and those with a spinel structure and stoichiometry, for example, $LiMn_2O_4$ ('LMO'), the latter NCA, NCM and LMO materials being used widely in batteries for transportation. These cathode materials are often stabilized at the surface or within the bulk of the structure by minor concentrations of substituent cations, such as additional lithium, as is the case for lithium-rich spinel cathodes, $Li_{1+x}Mn_{2-x}O_4$ in which x is typically less than 0.1, or aluminum, as is the case for NCA. NCM electrode materials are also known to be stabilized by adding additional lithium to the structure.

In examples of preferred embodiments, the electrodes comprise a 'layered-spinel' material of formula: $xLiMO_2 \cdot (1-x)Li_yM'_zO_4$, wherein $0<x<1$ and where $LiMO_2$ and $Li_yM'_zO_4$ refer to end member components of a compositional $LiMO_2$—$Li_yM'_zO_4$ tie-line; $LiMO_2$ is a lithium metal oxide having a layered structure in which M comprises one or more metal elements (e.g., transition metals, aluminum, and optionally lithium), and has a combined average metal oxidation state of +3 in its initial discharged state; $Li_yM'_zO_4$ is a lithium metal oxide having a spinel structure, $1 \le y \le 1.33$, $1.66 \le z \le 2$, and M' comprises one or more metal elements, and has a combined average metal oxidation state in the range of about +3.5 to about +4 in its initial discharged state. For example, when y=1 and z=2, the composition of the electrode is defined by the $LiMO_2$—$LiM'_2O_4$ tie-line of a binary system. M and M' are selected preferably from the first row transitional metal elements such as Ti, Mn, Ni and Co, and optionally include other elements such as Al and/or Li. In addition, the electrode materials of the invention include 'layered-spinel' materials described above in which the oxygen ions are partially substituted by fluorine ions, at the surface and/or within the bulk structure (interior) of particles of the composite oxide material.

In particular embodiments and examples of the invention, the layered component can have, for example, a composition of formula $Li_2MO_3$ ($Li[Li_{0.33}M_{0.67}]O_2$), such as $Li_2MnO_3$ and/or $Li_2TiO_3$; whereas the spinel component can have a composition within the family of lithium-rich spinels of formula $Li_{1+w}M'_{2-w}O_4$ ($0 \le w \le 0.33$), such as $Li_{1+w}Mn_{2-w}O_4$ or $Li_{1+w}Ti_{2-w}O_4$, and/or the lithium-rich spinel can have a composition in the family of lithiated spinels of formula $Li_{1+t}M'_2O_4$ ($\le t \le 1$), wherein M' preferably comprises or consists of Mn. The structure of the spinel component contains less lithium per transition metal than the layered $LiMO_2$ component and therefore contains more vacant interstitial sites (i.e., defect sites) than the layered $LiMO_2$ component, thereby introducing defects into the integrated (composite) 'layered-spinel' structures of the invention.

Layered $LiMO_2$ electrode structures containing cobalt and/or nickel, such as $LiCoO_2$ and $LiNi_{0.8}Co_{0.15}Al_{0.05}O_2$ are relatively stable to the repeated extraction and reinsertion of lithium during charge and discharge, respectively, compared to layered, manganese-rich structures such as layered $LiMnO_2$ that transforms to a spinel-type structure on repeated cycling. Furthermore, significantly higher capacities (typically ~150 mAh/g or higher) can be delivered by cobalt- and nickel-based layered structures above 3 V relative to the family of manganese oxide spinel electrode structures (80-120 mAh/g). From this standpoint, therefore, nickel- and cobalt-rich layered structures are more attractive than manganese-rich layered or spinel structures. In a preferred embodiment of this invention, the 'layered-spinel' electrode material of formula $xLiMO_2 \cdot (1-x)Li_yM'_zO_4$, M and M' together comprise Co, Mn and Ni, such that the cobalt content is higher than the combined manganese and nickel content within the electrode structure, or in which the nickel content is higher than the combined manganese and the cobalt content within the electrode structures. In yet another preferred embodiment, the combined cobalt and nickel content is higher than the manganese content within the electrode structures.

The electrodes of this invention can be prepared by reactions known in the art, such as conventional solid state reactions, co-precipitation, ion-exchange and sol-gel methods. The advantages of the 'layered-spinel' composite electrodes of the invention include improved structural stability to electrochemical cycling and increased capacity and energy relative to the layered electrode component or components on their own. Methods to embed $Li_2M'O_3$, spinel, lithiated spinel or rocksalt configurations or regions to stabilize the layered $LiMO_2$ components of the electrodes of the invention are disclosed.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

DETAILED DESCRIPTION

The energy density of current-day lithium-ion batteries is compromised to a significant extent by the structural instability of the cathode materials and their structures. Layered transition metal oxide cathode materials, particularly those containing cobalt and/or nickel, offer significantly higher capacities than manganese-oxide spinel cathodes and therefore offer the best opportunities for increasing the capacity and energy density of lithium-ion cells. Structural instabilities of cathode materials can be mitigated to a certain extent, for example, by protecting the surface of lithium-cobalt-oxide electrode particles, e.g., $LiCoO_2$ ('LCO') with aluminum oxide, or by aluminum-doping of lithium-nickel-cobalt-oxide electrode particles, e.g., $LiNi_{0.8}Co_{0.15}Al_{0.05}O_2$ ('NCA'), or by enriching lithium-nickel-cobalt-manganese-oxide ('NCM') electrode particles with extra lithium, e.g., $Li_{1+x}[Ni_{0.333}CO_{0.333}Mn_{0.333}]_{1-x}O_2$, or by minor substitution of the manganese ions in $LiMn_2O_4$ spinel electrodes with aluminum and or additional lithium ions.

This invention is related primarily to stabilized lithium-metal-oxide electrodes for non-aqueous lithium batteries, and more specifically lithium-metal-oxide cathodes comprising 'layered-spinel' materials for these batteries. The term 'layered-spinel' includes composite electrode structures comprising one or more layered components and compositions, one or more spinel components and compositions and/or one or more lithiated spinel components and compositions.

In examples of preferred embodiments, the electrodes comprise a 'layered-spinel' material of formula: $xLiMO_2(1-x)Li_yM'_zO_4$, wherein $0<x<1$ and where $LiMO_2$ and $Li_yM'_zO_4$ refer to end member components of a compositional $LiMO_2$—$Li_yM'_zO_4$ tie-line; $LiMO_2$ is a lithium metal oxide having a layered structure in which M comprises one or more metal elements (e.g., transition metals, aluminum, and optionally lithium), and has a combined average metal oxidation state of +3 in its initial discharged state; $Li_yM'_zO_4$ is a lithium metal oxide having a spinel structure, $1 \leq y \leq 1.33$, $1.66 \leq z \leq 2$, and M' comprises one or more metal elements, and has a combined average metal oxidation state in the range of about +3.5 to about +4 in its initial discharged state. For example, when $y=1$ and $z=2$, the composition of the electrode is defined by the $LiMO_2$—$LiM'_2O_4$ tie-line of a binary system. M and M' are selected preferably from the first row transition metal elements such as Ti, Mn, Ni and Co, and optionally include other elements such as Al and/or Li.

In particular embodiments and examples of the invention, the layered component can have, for example, a composition of formula $Li_2MO_3$ ($Li[Li_{0.33}M_{0.67}]O_2$), such as $Li_2MnO_3$ and/or $Li_2TiO_3$, in which M is partially Li, whereas the spinel component can have a composition within the family of lithium-rich spinels of formula $Li_{1+w}M'_{2-w}O_4$ ($0 \le w \le 0.33$), such as $Li_{1+w}Mn_{2-w}O_4$ or $Li_{1+w}Ti_{2-w}O_4$, and/or the lithium-rich spinel can have a composition in the family of lithiated spinels of formula $Li_{1+t}M'_2O_4$ ($0 \le t \le 1$), wherein M' preferably comprises or consists of Mn. The structure of the spinel component contains less lithium per transition metal than the layered $LiMO_2$ component and therefore contains more vacant interstitial sites (i.e., defect sites) than the layered $LiMO_2$ component, thereby introducing defects into the structurally-integrated (composite) 'layered-spinel' electrode materials of the invention.

The electrode structures of this invention are complex and can have cation and anion distributions that deviate from their ideal arrangements in layered and spinel structures. The structures or components may include other localized configurations or regions, such as disordered or partially disordered layered-, spinel-, lithiated-spinel-, rocksalt (e.g., MO or M'O) regions, crystallographic cationic and/or anionic defects, and the like, including regions with intermediate layered, spinel, lithiated-spinel and/or rocksalt cation distributions.

Layered $LiMO_2$ electrode structures containing cobalt and/or nickel, such as $LiCoO_2$ and $LiNi_{0.8}Co_{0.15}Al_{0.05}O_2$ are relatively stable to the repeated extraction and reinsertion of lithium during charge and discharge, respectively, compared to layered, manganese-rich structures such as layered $LiMnO_2$ that transforms to a spinel-type structure on repeated cycling. Furthermore, significantly higher capacities (typically about 150 mAh/g or higher) can be delivered by cobalt- and nickel-based layered structures above 3 V relative to the family of manganese oxide spinel electrode structures (80-120 mAh/g). From this standpoint, therefore, nickel- and cobalt-rich layered structures are more attractive than manganese-rich layered or spinel structures.

In a preferred embodiment of the 'layered-spinel' electrode material of formula $xLiMO_2 \cdot (1-x)Li_yM'_zO_4$, M and M' together comprise Co, Mn and Ni, such that the cobalt content is higher than the combined manganese and nickel content within the electrode structure, or in which the nickel content is higher than the combined manganese and the cobalt content within the electrode structures. In yet another preferred embodiment, the combined cobalt and nickel content is higher than the manganese content within the electrode structures.

Non-limiting examples of the 'layered-spinel' electrode materials useful in the electrodes of this invention include stabilized $LiCoO_2$ ('LCO') materials; $LiNi_{0.80}Co_{0.15}Al_{0.05}O_2$ ('NCA') materials; and $LiNi_{1-a-b}Mn_aCo_bO_2$ ('NMC' ($0 \le a \le 1$; $0 \le b \le 1$)) materials, optionally containing extra lithium, such as those with targeted formulae in their preparation, for example:

$0.95LiCoO_2 \cdot 0.05LiMn_2O_4$;
$0.95LiCoO_2 \cdot 0.05Li_{1.1}Mn_{1.9}O_4$;
$0.95LiCoO_2 \cdot 0.05Li_{1.33}Mn_{1.67}O_4$;
$0.95LiCoO_2 \cdot 0.05Li_{1.33}Ti_{1.67}O_4$;
$0.90LiCoO_2 \cdot 0.05Li_2MnO_3 \cdot 0.05LiMn_2O_4$;
$0.90LiCoO_2 \cdot 0.05Li_2MnO_3 \cdot 0.05Li_{1.1}Mn_{1.9}O_4$;
$0.95LiNi_{0.80}Co_{0.15}Al_{0.05}O_2 \cdot 0.05LiMn_2O_4$;
$0.95LiNi_{0.80}Co_{0.15}Al_{0.05}O_2 \cdot 0.05Li_{1.1}Mn_{1.9}O_4$;
$0.95LiNi_{0.80}Co_{0.15}Al_{0.05}O_2 \cdot 0.05Li_{1.33}Mn_{1.67}O_4$;
$0.90LiNi_{0.80}Co_{0.15}Al_{0.05}O_2 \cdot 0.10Li_{1.33}Ti_{1.67}O_4$;
$0.90LiNi_{0.80}Co_{0.15}Al_{0.05}O_2 \cdot 0.05Li_2MnO_3 \cdot 0.05LiMn_2O_4$;
$0.90LiNi_{0.80}Co_{0.15}Al_{0.05}O_2 \cdot 0.05Li_2MnO_3 \cdot 0.05Li_{1.1}Mn_{1.9}O_4$;
$0.90LiNi_{0.80}Co_{0.15}Al_{0.05}O_2 \cdot 0.10Li_2[Co_2]O_4$;
$0.95LiNi_{0.33}Mn_{0.33}Co_{0.33}O_2 \cdot 0.05LiMn_2O_4$;
$0.95LiNi_{0.33}Mn_{0.33}Co_{0.33}O_2 \cdot 0.05Li_{1.1}Mn_{1.9}O_4$;
$0.95LiNi_{0.33}Mn_{0.33}Co_{0.33}O_2 \cdot 0.05Li_{1.33}Mn_{1.67}O_4$;
$0.90LiNi_{0.33}Mn_{0.33}Co_{0.33}O_2 \cdot 0.10Li_{1.33}Ti_{1.67}O_4$;
$0.90LiNi_{0.33}Mn_{0.33}Co_{0.33}O_2 \cdot 0.05Li_2MnO_3 \cdot 0.05Li_{1.1}Mn_{1.9}O_4$; and
$0.95LiNi_{0.50}Mn_{0.30}Co_{0.20}O_2 \cdot 0.05Li_{1.1}Mn_{1.9}O_4$.

The materials listed above illustrate the principles of the invention whereby, in a structurally integrated electrode, a minor concentration of one or more of a spinel component, such as a spinel from the $Li_{1+x}Mn_{2-x}O_4$ system, a lithiated spinel component, such as $Li_2[Co_2]O_4$, or a lithium-rich layered component, such as $Li_2MnO_3$, are used to stabilize a layered $LiMO_2$ component, in which M comprises one or more metal ions, selected from one or more of Co, Ni, Mn, and in which the Co:Mn, Ni:Mn, or Co+Ni:Mn ratio is greater than 1:1. The advantages of a layered $Li_2MO_3$ component, such as $Li_2MnO_3$, alternatively describable as $Li[Li_{1/3}Mn_{2/3}]O_2$, is that the surplus lithium in the Mn layer can diffuse into the lithium layer of the composite electrode structure at low lithium loadings, whereas the spinel and lithiated spinel components provide stabilizing transition metal ions, such as Mn and Co, in the lithium layers of the composite electrode structure, with both $Li_2MO_3$ and spinel components contributing to the binding energy between the oxygen planes and, therefore, to the increased stability of the electrode structure at low lithium loadings.

The electrodes of this invention can be prepared by reactions known in the art, such as conventional solid state reactions, co-precipitation, ion-exchange and sol-gel methods. For example, the electrode compositions and structures of the invention can be synthesized by an ion-exchange method using a layered template as a precursor and reacting it with the required amount of Li and M in solution followed by a heat-treatment step to introduce another layered or spinel component, as described by Croy et al., in Electrochemistry Communications, Volume 13, pages 1063-1066 (2011).

The advantages of the 'layered-spinel' composite electrodes of the invention include improved structural stability to electrochemical cycling and increased capacity and energy relative to the layered electrode component or components on their own.

A unique aspect of this invention are methods to embed $Li_2M'O_3$, spinel, lithiated spinel or rocksalt regions, as described herein, to stabilize the layered $LiMO_2$ components of the electrodes of the invention, either within, or at the surface of the particles of the composite oxide, or both. The stabilizing component can be introduced by heating (e.g., at a temperature in the range of 400 to 850° C.) a solid precursor compound or compounds that, in the presence of the layered $LiMO_2$ component, decompose into a stabilizing layered component and/or a stabilizing spinel component.

For example, heating $LiMnO_2$ (or $LiMnO_2$ precursor compounds such as lithium hydroxide, lithium carbonate, manganese oxalate, manganese hydroxide, manganese oxyhydroxide, manganese carbonate, or the like) in air at temperatures ranging, for example, from 600 to 850° C., decomposes the precursor into stabilizing $Li_2MnO_3$ (layered) and $LiMn_2O_4$ (spinel) components according to the reaction: $LiMnO_2 \rightarrow Li_2MnO_3 + LiMn_2O_4$, thereby providing a method to form stabilizing layered and spinel components and configurations at the surface or within the bulk of layered LCO-, NCA- or NMC-type structures, the extent of formation and reaction being dependent on the temperature, atmosphere, and dwell times used. Likewise, as an example, a stabilizing lithiated spinel component, such as $Li_2[Co_2]O_4$ or an intermediate layered-$LiCoO_2$/lithiated spinel $Li_2[Co_2]O_4$-type structure, can be formed at the surface or within the bulk of the particles of the composite oxide by heating appropriate lithium and cobalt precursor materials such as lithium hydroxide, lithium carbonate, cobalt oxalate, cobalt hydroxide, cobalt carbonate, or the like, in air at a temperature, e.g., in the range of about 400 to 600° C.

Cathodes for electrochemical tests of exemplary materials were prepared typically by coating Al foil with a slurry containing 84 percent by weight (wt %) of the oxide powder, 8 wt % SUPER P carbon (TIMCAL Ltd.), and 8 wt % polyvinylidene difluoride (PVDF) binder in N-methylpyrrolidone (NMP), and assembled in coin cells (size 2032). The cells contained a metallic lithium anode. The electrolyte was a 1.2 M solution of $LiPF_6$ in a 3:7 mixture of ethylene carbonate (EC) and ethyl methyl carbonate (EMC). Coin cells were assembled in a glovebox under an inert argon atmosphere prior to electrochemical evaluation.

The principles of the invention have been reduced to practice and are embodied in the following examples:

Example 1

A 'layered-spinel' product with a targeted composition $0.95LiCoO_2 \cdot 0.05Li_{1.1}Mn_{1.9}O_4$ was prepared by reacting a $LiCoO_2$ precursor with the stoichiometrically required amounts of lithium and manganese nitrates in either a 0.1 M solution of $HNO_3$ or substantially pure $H_2O$ and stirred overnight at room temperature. Thereafter, the liquid from the solution was evaporated at approximately 70° C., and the resulting solid product collected and ground to a powder. This process is generally referred to herein as the 'wet impregnation' method. The powder was then annealed at about 500° C. for about 8 hours in air. It can be expected that variations and optimization of synthesis parameters, e.g., temperature, dwell times, rates of cooling, etc. will lead to improvements in structural, morphological and electrochemical properties of the materials of this invention.

Figure 1:
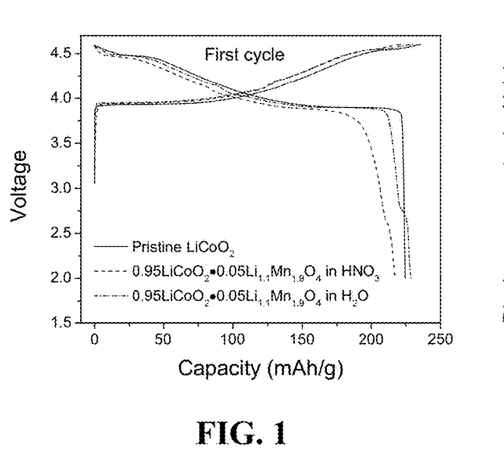
FIG. 1 depicts the electrochemical charge/discharge profiles of three Li half-cells with: (1) a pristine layered $LiCoO_2$; (2) a compositionally-targeted $0.95LiCoO_2 \cdot 0.05Li_{1.1}Mn_{1.9}O_4$ electrode material prepared in nitric acid; and (3) a compositionally-targeted $0.95LiCoO_2 \cdot 0.05Li_{1.1}Mn_{1.9}O_4$ electrode material prepared in water, when charged and discharged between 4.6 and 2.0 V at 15 mA/g.

FIG. 1 shows the first cycle electrochemical voltage profiles of three lithium half cells with: (1) a pristine layered $LiCoO_2$ electrode material; (2) an electrode material with a targeted composition $0.95LiCoO_2 \cdot 0.05Li_{1.1}Mn_{1.9}O_4$ prepared in nitric acid; and (3) an electrode material with a targeted composition $0.95LiCoO_2 \cdot 0.05Li_{1.1}Mn_{1.9}O_4$ prepared in water. The electrodes were electrochemically cycled continuously between 4.6 and 2.0 V at 15 mA/g. The data in FIG. 1 clearly demonstrate the incorporation of a spinel component as evidenced by additional activity at about 2.7 and 4.1 V, consistent with the principles of this invention. The applicants believe that the inclusion of a spinel component in the layered material creates a stabilized integrated 'layered-spinel' electrode structure that enhances the electrochemical performance, notably the cycling stability, relative to pure $LiCoO_2$.

Figure 2:
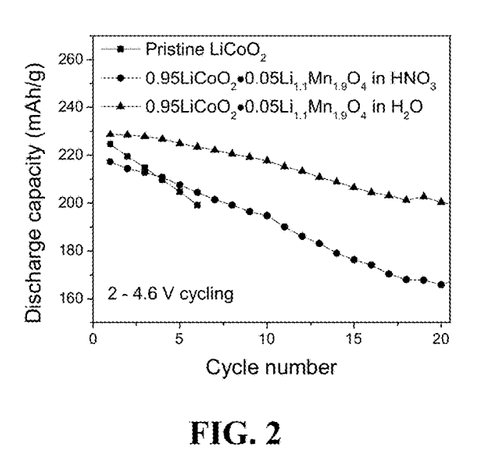
FIG. 2 depicts the electrochemical cycling stability of three Li half-cells with: (1) a pristine layered $LiCoO_2$ electrode; (2) a compositionally-targeted $0.95LiCoO_2 \cdot 0.05Li_{1.1}Mn_{1.9}O_4$ electrode material prepared in nitric acid; and (3) a compositionally-targeted $0.95LiCoO_2 \cdot 0.05Li_{1.1}Mn_{1.9}O_4$ electrode material prepared in water, when charged and discharged between 4.6 and 2.0 V at 15 mA/g.

FIG. 2 shows the electrochemical cycling behavior of the electrodes in FIG. 1. The data in FIG. 2 show a significant improvement in discharge capacity retention on cycling for an electrode with the composition $0.95LiCoO_2 \cdot 0.05Li_{1.1}Mn_{1.9}O_4$ prepared in water relative to the pristine $LiCoO_2$ electrode. The $0.95LiCoO_2 \cdot 0.05Li_{1.1}Mn_{1.9}O_4$ electrode prepared in nitric acid shows more capacity fade than the electrode prepared in water, but less than the pristine $LiCoO_2$ electrode. The data clearly emphasize the stabilizing properties of the spinel component as well as the importance of the synthesis method in influencing the electrochemical properties of the electrode material.

Figure 3:
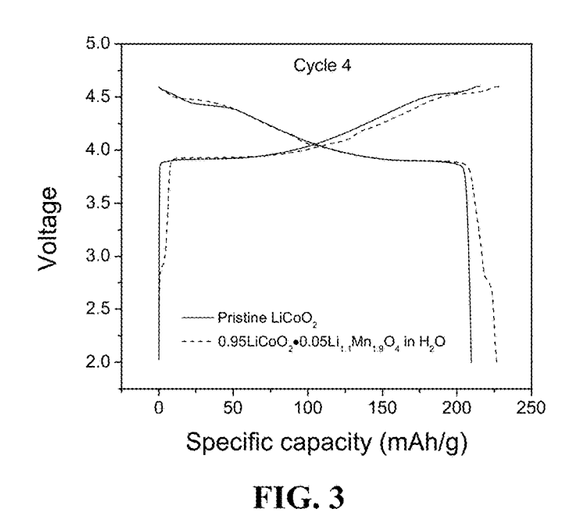
FIG. 3 depicts the fourth cycle electrochemical charge/discharge profiles of two Li half-cells with: (1) a pristine layered $LiCoO_2$ electrode; and (2) a compositionally-targeted $0.95LiCoO_2 \cdot 0.05Li_{1.1}Mn_{1.9}O_4$ electrode material prepared in water, when charged and discharged between 4.6 and 2.0 V at 15 mA/g.

The stabilizing properties remain in the electrode structure when the lithium cells are cycled between 4.6 and 2.0 V, as shown by the fourth cycle voltage profiles in FIG. 3. The additional electrochemical activity of the spinel component in the 'layered-spinel' electrode material during discharge at about 2.7 V is apparent. Of particular significance, is that this plateau can be used as an end-of-discharge indicator for layered-spinel electrodes in lithium cells.

Example 2

Stoichiometric amounts of lithium and manganese nitrates in ethanol were added to a commercially-prepared $LiNi_{0.50}Mn_{0.30}Co_{0.20}O_2$ powder to produce an electrode material with a targeted composition $0.95LiNi_{0.50}Mn_{0.30}Co_{0.20}O_2 \cdot 0.05Li_{1.1}Mn_{1.9}O_4$, using the general procedures described in Example 1. After evaporating the ethanol at approximately 70° C., the resulting solid product was annealed at about 500° C. for about 8 hours in air.

Figure 4A:
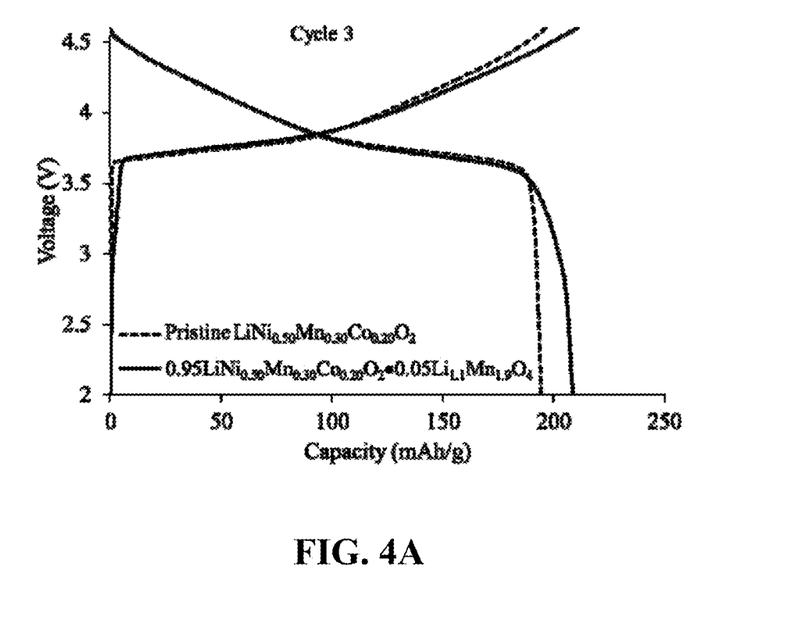
FIG. 4A depicts the third cycle electrochemical charge/discharge profiles of two Li half-cells with: (1) a pristine layered $LiNi_{0.50}Mn_{0.30}Co_{0.20}O_2$ electrode and (2) a compositionally-targeted $0.95LiNi_{0.50}Mn_{0.30}CO_{0.20}O_2 \cdot 0.05Li_{1.1}Mn_{1.9}O_4$ electrode material prepared in ethanol, when charged and discharged between 4.6 and 2.0 V at 15 mA/g.

FIG. 4A shows the electrochemical voltage profiles of the $3^{rd}$ cycle of two lithium half cells, one containing a pristine $LiNi_{0.50}Mn_{0.30}CO_{0.20}O_2$ (NMC) cathode, and the second containing a targeted $0.95LiNi_{0.50}Mn_{0.30}CO_{0.20}O_2 \cdot 0.05Li_{1.1}Mn_{1.9}O_4$ cathode composition. The cells were cycled between 4.6 and 2.0 V at 15 mA/g, the latter composite electrode providing a superior capacity as a result of the lithium-manganese-oxide component with nominal composition $Li_{1.1}Mn_{1.9}O_4$ that had been embedded in the $LiNi_{0.50}Mn_{0.30}Co_{0.20}O_2$ structure.

Figure 4B:
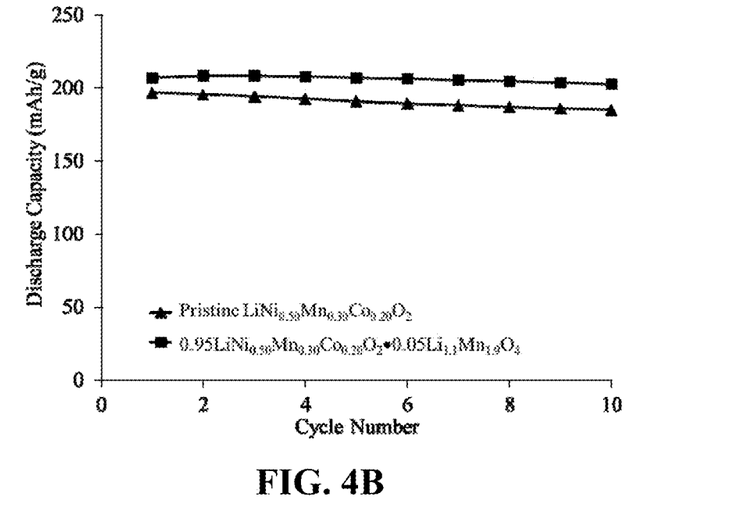
FIG. 4B depicts the relative cycling stability of the two electrodes referred to in FIG. 4A.

FIG. 4B shows the electrochemical cycling behavior of the electrodes in FIG. 4A, illustrating the superior capacity of the NMC electrode treated with lithium-manganese-oxide.

Example 3

Layered-spinel electrode materials were prepared using a $LiNi_{0.80}CO_{0.15}Al_{0.05}O_2$ (NCA) precursor by two different methods. In the first method, stoichiometric amounts of lithium and cobalt nitrates in ethanol were added to a commercial-grade NCA powder to produce an electrode material with a targeted composition $0.90LiNi_{0.80}CO_{0.15}Al_{0.05}O_2 \cdot 0.1Li_2[Co_2]O_4$. After stirring overnight, the liquid from the solution was evaporated at approximately 70° C., and the resulting solid product collected and ground to a powder and annealed in air at 400° C. and, separately, at 600° C. In the second method, lithium and cobalt carbonate powders were intimately mixed with the same commercial-grade NCA powder and reacted at 400° C. and at 600° C. for 72 hours by solid state reaction in air. The lower temperature was used to target the lithiated spinel structure $Li_2[Co_2]O_4$, whereas the higher temperature was used to reduce the amount of cobalt in the lithium-rich layer of the lithiated spinel electrode structure, thereby reducing the spinel content and increasing the layered character of the final electrode product.

Figure 5A:
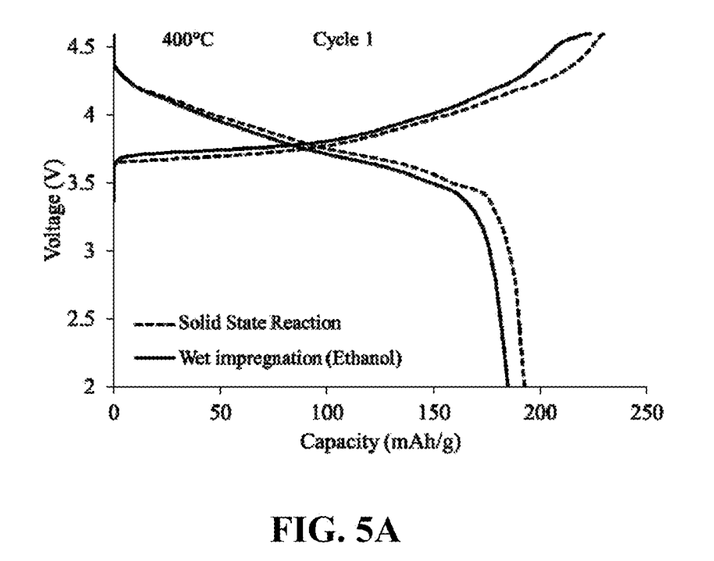
FIG. 5A depicts the first cycle electrochemical charge/discharge profiles of two Li half-cells with: a compositionally-targeted $0.90LiNi_{0.80}CO_{0.15}Al_{0.05}O_2 \cdot 0.10Li_2[Co_2]O_4$ electrode prepared by (1) a solid state reaction; and (2) a 'wet impregnation' method followed by annealing at 400° C., when charged and discharged between 4.6 and 2.0 V at 15 mA/g.
Figure 5B:
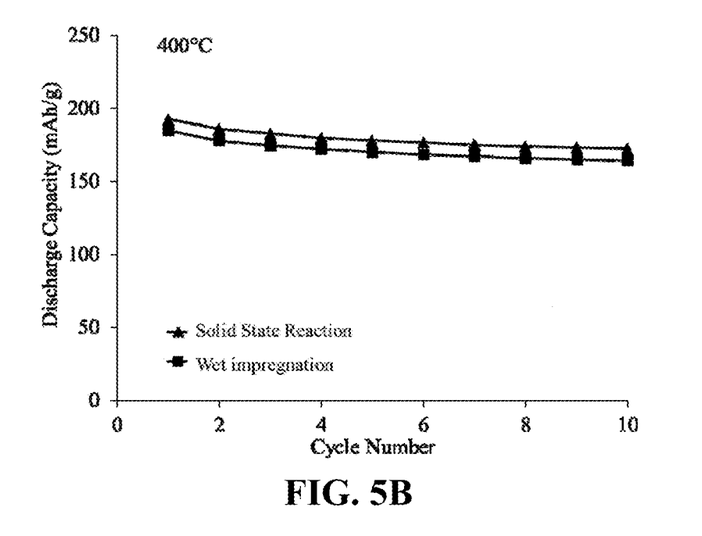
FIG. 5B: depicts the relative cycling stability of two electrodes referred to in FIG. 5A.
Figure 6A:
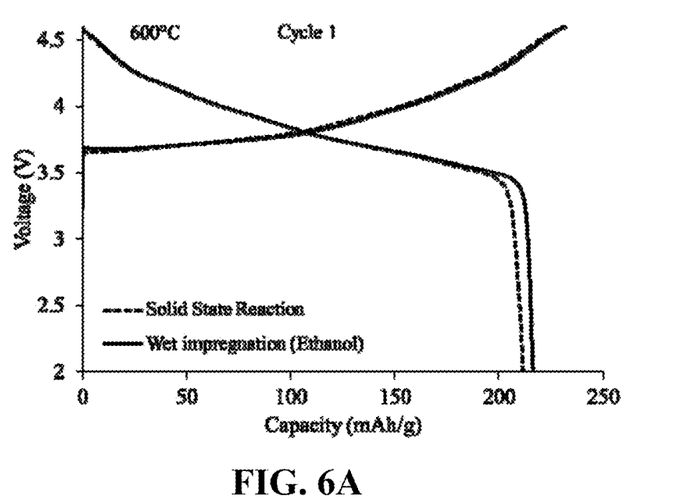
FIG. 6A depicts the first cycle electrochemical charge/discharge profiles of two Li half-cells with: a compositionally-targeted $0.90LiNi_{0.80}CO_{0.15}Al_{0.05}O_2 \cdot 0.10Li_2[Co_2]O_4$ electrode prepared by (1) a solid state reaction and (2) a 'wet impregnation' method followed by annealing at 600° C., when charged and discharged between 4.6 and 2.0 V at 15 mA/g.
Figure 6B:
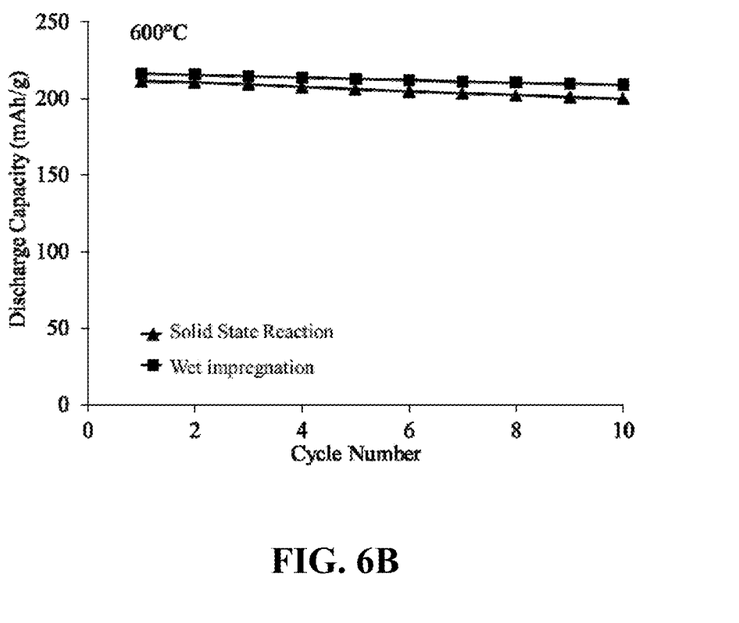
FIG. 6B: depicts the relative cycling stability of two electrodes referred to in FIG. 6A.

FIG. 5A shows the first-cycle charge-discharge voltage profiles of two electrode materials that had been annealed at 400° C. by (1) wet impregnation, and (2) solid state reaction. Both discharge profiles show a point of inflection and short plateau at about 3.5 V, which is a characteristic feature of the lithiated spinel component $Li_2Co_2O_4$, consistent with the principles of this invention. The data also provide evidence that the method of preparation influences the electrode capacity and results in significant differences to the voltage profile of the cell, particularly during charge to 4.6 V. Specifically, the electrochemical cycling data in FIG. 5B indicate that the $0.90LiNi_{0.80}CO_{0.15}Al_{0.05}O_2 \cdot 0.1Li_2[Co_2]O_4$ electrode product prepared by solid state reaction provides a capacity that is superior to the capacity of the electrode prepared by the 'wet impregnation' method. The electrochemical properties of the electrode material annealed at 600° C. are provided, for comparison, in FIGS. 6A and 6B. These electrodes yielded a significantly higher capacity (>210 mAh/g) than those annealed at 400° C. (>175 mAh/g, FIG. 5A) and cycled with significantly improved stability. The apparent disappearance of a distinct plateau at about 3.4-3.5 V is consistent with the transformation of the lithiated spinel structure $Li_2[Co_2]O_4$ towards a layered $LiCoO_2$ structure, which is typically prepared at about 850° C., resulting in a '$LiCoO_2$' component with intermediate layered-spinel character in the electrode structure, consistent with the principles and structural configurations of this invention.

This invention extends to include surface modifications of the cathode materials described herein, for example, using metal-oxide, metal-fluoride or metal-phosphate layers or coatings known in the art to protect the electrode materials from highly oxidizing potentials in the cells and from other undesirable effects, such as electrolyte oxidation, oxygen loss, and/or dissolution. Such surface protection enhances the surface stability, rate capability and cycling stability of the electrode materials of the invention.

Exemplary Electrochemical Cell and Battery.

Figure 7:
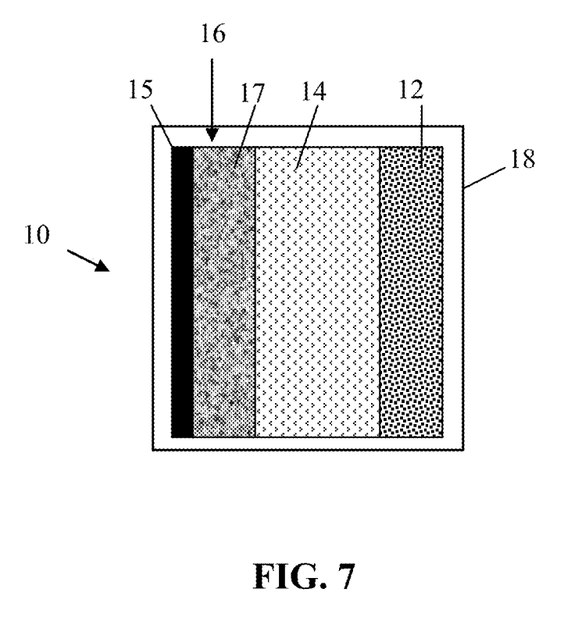
FIG. 7 depicts a schematic representation of an electrochemical cell.
Figure 8:
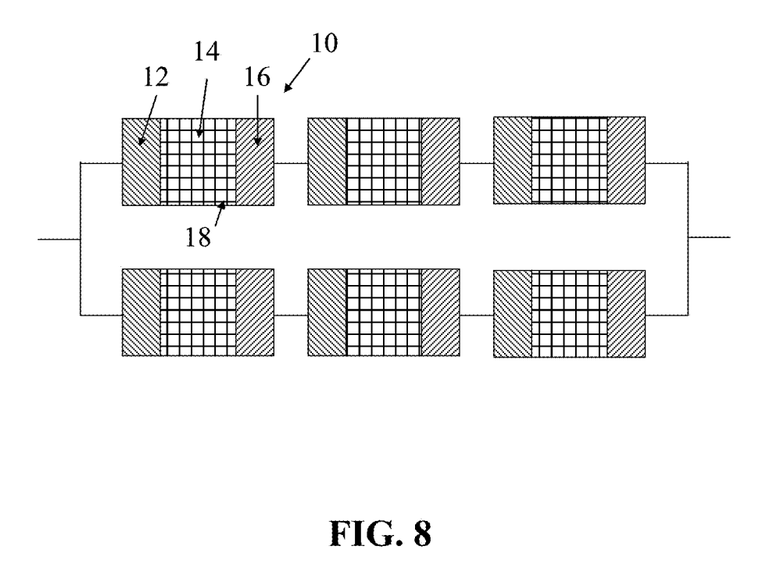
FIG. 8 depicts a schematic representation of a battery consisting of a plurality of cells connected electrically in series and in parallel.

A detailed schematic illustration of a lithium electrochemical cell 10 of the invention is shown in FIG. 7. Cell 10 comprises negative electrode 12 separated from positive electrode 16 by a separator 14 saturated with the electrolyte, all contained in insulating housing 18 with suitable terminals (not shown) being provided in electronic contact with negative electrode 12 and positive electrode 16 of the invention. Positive electrode 16 comprises metallic collector plate 15 and active layer 17 comprising the cobalt-stabilized lithium metal oxide material described herein. FIG. 8 provides a schematic illustration of one example of a battery in which two strings of electrochemical cells 10, described above, are arranged in parallel, each string comprising three cells 10 arranged in series.

The use of the terms "a" and "an" and "the" and similar referents in the context of describing the invention are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. An electrode for a lithium-ion cell comprising metal oxide particles, wherein the metal oxide particles consist essentially of a structurally integrated 'layered-spinel' composite oxide structure of formula $xLiMO_2 \cdot (1-x)Li_yM'_zO_4$, wherein $0<x<1$; $LiMO_2$ is a lithium metal oxide having a layered structure in which M comprises one or more transition metal elements, and has a combined average metal oxidation state of about +3 in an initial discharged state thereof; and $Li_yM'_zO_4$ is a lithium metal oxide having a spinel structure, $1 \leq y \leq 1.33$, $1.66 \leq z \leq 2$, and M' comprises one or more transition metal elements, and has a combined average metal oxidation state in the range of about +3.5 to about +4 in an initial discharged state thereof; and wherein the integrated 'layered-spinel' composite oxide structure is formed by heating a precursor composition in air at a temperature in the range of about 600 to about 850° C., wherein the precursor composition comprises either (a) $LiMO_2$ mixed with a targeted stoichiometric amount of Li and M' nitrates, or (b) a mixture of Li, M, and M' hydroxides, carbonates, and/or oxalates in a targeted stoichiometric ratio of Li, M and M'.

2. The electrode of claim 1, wherein M and M' comprise one or more first row transition metal elements.

3. The electrode of claim 1, wherein the transition metal elements comprise one or more of Mn, Ni and Co.

4. The electrode of claim 1, wherein one or more of M and M' further comprises Ti.

5. The electrode of claim 1, wherein one or more of M and M' further comprises Al.

6. The electrode of claim 1, wherein the metal oxide having a layered structure comprises a material of formula $Li[Li_{0.33}Mn_{0.67}]O_2$.

7. The electrode of claim 1, wherein the metal oxide having a layered structure comprises a material of formula $Li[Li_{0.33}Ti_{0.67}]O_2$.

8. The electrode of claim 1, wherein the metal oxide having a layered structure comprises a $LiCoO_2$ material.

9. The electrode of claim 1, wherein the metal oxide having a layered structure comprises a $LiNi_{0.80}Co_{0.15}Al_{0.05}O_2$ material.

10. The electrode of claim 1, wherein the metal oxide having a layered structure comprises a $LiNi_{1-a-b}Mn_aCo_bO_2$, material, wherein $0 \le a \le 1$; $0 \le b < 1$.

11. The electrode of claim 1, wherein the metal oxide having a spinel structure comprises a material of formula $Li_{1+w}M'_{2-w}O_4$ ($0 \le w \le 0.33$).

12. The electrode of claim 11, wherein the metal oxide having a spinel structure comprises a material of formula $Li_{1+w}Mn_{2-w}O_4$.

13. The electrode of claim 11, wherein the metal oxide having a spinel structure comprises a material of formula $Li_{1+w}Ti_{2-w}O_4$.

14. The electrode of claim 1, wherein the metal oxide having a spinel structure comprises a material of formula $Li_{1-t}M'_2O_4$, wherein $0 \le t \le 1$.

15. The electrode of claim 1, wherein the 'layered-spinel' composite oxide is a material selected from the group consisting of:

$0.95LiCoO_2 \cdot 0.05LiMn_2O_4$;
$0.95LiCoO_2 \cdot 0.05Li_{1.1}Mn_{1.9}O_4$;
$0.95LiCoO_2 \cdot 0.05Li_{1.33}Mn_{1.67}O_4$;
$0.95LiCoO_2 \cdot 0.05Li_{1.33}Ti_{1.67}O_4$;
$0.95LiNi_{0.80}Co_{0.15}Al_{0.05}O_2 \cdot 0.05LiMn_2O_4$;
$0.95LiNi_{0.80}Co_{0.15}Al_{0.05}O_2 \cdot 0.05Li_{1.1}Mn_{1.9}O_4$;
$0.95LiNi_{0.80}Co_{0.15}Al_{0.05}O_2 \cdot 0.05Li_{1.33}Mn_{1.67}O_4$;
$0.90LiNi_{0.80}Co_{0.15}Al_{0.05}O_2 \cdot 0.10Li_{1.33}Ti_{1.67}O_4$;
$0.90LiNi_{0.80}Co_{0.15}Al_{0.05}O_2 \cdot 0.10Li_2[CO_2]O_4$;
$0.95LiNi_{0.33}Mn_{0.33}Co_{0.33}O_2 \cdot 0.05LiMn_2O_4$;
$0.95LiNi_{0.33}Mn_{0.33}Co_{0.33}O_2 \cdot 0.05Li_{1.1}Mn_{1.9}O_4$;
$0.95LiNi_{0.33}Mn_{0.33}Co_{0.33}O_2 \cdot 0.05Li_{1.33}Mn_{1.67}O_4$;
$0.90LiNi_{0.33}Mn_{0.33}Co_{0.33}O_2 \cdot 0.10Li_{1.33}Ti_{1.67}O_4$; and
$0.95LiNi_{0.50}Mn_{0.30}Co_{0.20}O_2 \cdot 0.05Li_{1.1}Mn_{1.9}O_4$.

16. The electrode of claim 1, wherein the composite oxide includes one or more localized configurations or regions comprising (a) disordered layered-, spinel-, lithiated-spinel-, and/or rocksalt structures, (b) partially disordered layered-, spinel-, lithiated-spinel-, and/or rocksalt structures, (c) crystallographic cationic defects, (d) crystallographic anionic defects, and/or (e) cation distributions that are intermediate between layered, spinel, lithiated-spinel and/or rocksalt cation distributions.

17. The electrode of claim 1, wherein M and M' of the composite oxide together comprise a combination of Co, Mn and Ni, in which the cobalt content of the combination is higher than the combined manganese and nickel content thereof.

18. The electrode of claim 1, wherein M and M' of the composite oxide together comprise a combination of Co, Mn and Ni, in which the nickel content of the combination is higher than the combined manganese and the cobalt content thereof.

19. The electrode of claim 1, wherein M and M' of the composite oxide together comprise a combination of Co, Mn and Ni, in which the combined content of cobalt and nickel in the composite oxide is higher than the manganese content thereof.

20. An electrochemical cell comprising an anode, a cathode comprising the electrode of claim 1, and a lithium-containing electrolyte contacting the anode and the cathode.

21. The electrochemical cell of claim 20, wherein the cathode further comprises carbon particles and a binder.

22. The electrochemical cell of claim 21, wherein the binder comprises polyvinylidene difluoride (PVDF).

23. The electrochemical cell of claim 20, wherein the electrolyte comprises a solution of $LiPF_6$ in a mixture of ethylene carbonate (EC) and ethyl methyl carbonate (EMC).

24. A battery comprising a plurality of electrically connected electrochemical cells of claim 20, arranged in series, parallel, or both.

25. An electrode for a lithium-ion cell comprising metal oxide particles, wherein the metal oxide particles consist essentially of a structurally integrated 'layered-spinel' composite oxide structure of formula $xLiMO_2 \cdot (1-x)Li_yM'_zO_4$, wherein $0.90 \le x \le 0.95$; $LiMO_2$ is a lithium metal oxide having a layered structure in which M comprises one or more transition metal elements, and has a combined average metal oxidation state of about +3 in an initial discharged state thereof; and $Li_yM'_zO_4$ is a lithium metal oxide having a spinel structure, $1 \le y \le 1.33$, $1.66 \le z \le 2$, and M' comprises one or more transition metal elements, and has a combined average metal oxidation state in the range of about +3.5 to about +4 in an initial discharged state thereof; and wherein the integrated 'layered-spinel' composite oxide structure is formed by heating a precursor composition in air at a temperature in the range of about 600 to about 850° C., wherein the precursor composition comprises either (a) $LiMO_2$ mixed with a targeted stoichiometric amount of Li and M' nitrates, or (b) a mixture of Li, M, and M' hydroxides, carbonates, and/or oxalates in a targeted stoichiometric ratio of Li, M and M'.

* * * * *

UNITED STATES PATENT AND TRADEMARK OFFICE
CERTIFICATE OF CORRECTION

PATENT NO. : 10,573,889 B2
APPLICATION NO. : 14/982226
DATED : February 25, 2020
INVENTOR(S) : Michael M. Thackeray et al.

Page 1 of 1

It is certified that error appears in the above-identified patent and that said Letters Patent is hereby corrected as shown below:

In the Claims

Claim 15, Column 11, Line 37, delete "$Mn_{19}O_4$" and insert --$Mn_{1.9}O_4$--.

Signed and Sealed this
Thirty-first Day of March, 2020

Andrei Iancu
*Director of the United States Patent and Trademark Office*